(12) United States Patent
Odagaki

(10) Patent No.: US 9,253,384 B2
(45) Date of Patent: Feb. 2, 2016

(54) IMAGING APPARATUS

(71) Applicant: CANON KABUSHIKI KAISHA, Tokyo (JP)

(72) Inventor: Koichi Odagaki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/606,486

(22) Filed: Jan. 27, 2015

(65) Prior Publication Data
US 2015/0215507 A1 Jul. 30, 2015

(30) Foreign Application Priority Data

Jan. 30, 2014 (JP) ................................ 2014-016024

(51) Int. Cl.
*H04N 5/225* (2006.01)
*G03B 17/56* (2006.01)
*G03B 15/04* (2006.01)

(52) U.S. Cl.
CPC ............ *H04N 5/2254* (2013.01); *G03B 17/566* (2013.01); *G03B 15/041* (2013.01); *G03B 15/0421* (2013.01)

(58) Field of Classification Search
CPC ............. H04N 5/2254; G03B 15/0421; G03B 15/041; G03B 17/566; G03B 17/561
See application file for complete search history.

(56) References Cited

U.S. PATENT DOCUMENTS

| 7,623,773 B2 | 11/2009 | Yamashita | |
|---|---|---|---|
| 2005/0237426 A1* | 10/2005 | Takashima et al. .... | G03B 15/05 348/375 |
| 2009/0169199 A1* | 7/2009 | Takano ................... | G03B 11/00 396/544 |
| 2012/0315029 A1* | 12/2012 | Ryu ....................... | G03B 15/05 396/542 |
| 2013/0002897 A1* | 1/2013 | Imafuji et al. ........... | G03B 7/26 348/220.1 |
| 2013/0010185 A1* | 1/2013 | Motoki et al. ......... | H01R 24/62 348/375 |
| 2013/0223831 A1* | 8/2013 | Miyakawa et al. .... | G03B 15/05 396/155 |
| 2014/0071341 A1* | 3/2014 | Takagi ................. | H04N 5/2252 348/375 |

* cited by examiner

*Primary Examiner* — Nicholas Giles
*Assistant Examiner* — Abdelaaziz Tissire
(74) *Attorney, Agent, or Firm* — Canon USA, Inc. IP Division

(57) ABSTRACT

In an accessory shoe member placed on top of a base member, a pair of engagement portions is formed in a first direction perpendicular to an attachment direction of an external accessory device, and a plurality of fastening holes is formed side by side in the first direction. A plurality of fastening members is inserted into the plurality of fastening holes with the accessory shoe member placed on top of the base member, thereby fastening the base member and the accessory shoe member to an imaging apparatus. In the accessory shoe member, a joining portion joining the pair of engagement portions is formed. The accessory shoe member is formed by bending a plate metal material into a loop shape so that a joint is located between the plurality of fastening holes.

7 Claims, 11 Drawing Sheets

IMAGING APPARATUS

BACKGROUND

1. Field of the Invention

The present disclosure relates to an imaging apparatus including an accessory shoe to which an external accessory device can be attached.

2. Description of the Related Art

There is an imaging apparatus including an accessory shoe to which an external accessory device such as a flash unit for illuminating an object is attached, as discussed in U.S. Pat. No. 7,623,773.

In such an accessory shoe, when a connection portion provided in an external accessory device is pressed against a pair of engagement portions formed in the direction perpendicular to the attachment direction of the external accessory device, the external accessory device is fixed to the accessory shoe.

In the accessory shoe discussed in U.S. Pat. No. 7,623,773, if a force to tilt the front side of an upper portion of an attached external accessory device backward (force F2 in FIG. 8) is applied to the external accessory device, a stress concentrates on a pair of engagement portions of an accessory shoe member. More specifically, a large stress is generated on the front side of the pair of engagement portions in the attachment direction of the external accessory device. Particularly, an attached external accessory device having the larger size in the height direction is subjected to the larger stress on the front side of the pair of engagement portions due to the principle of the leverage.

A large stress cannot be received by the accessory shoe member (shoe plate 18) in the shape discussed in U.S. Pat. No. 7,623,773. This may result in deformation of the accessory shoe member.

SUMMARY OF THE INVENTION

According to an aspect disclosed herein, an imaging apparatus including an accessory shoe to which an external accessory device can be attached includes a base member, an accessory shoe member placed on top of the base member and configured to have a pair of engagement portions formed in a first direction perpendicular to an attachment direction of the external accessory device, and a plurality of fastening holes formed side by side in the first direction, and a plurality of fastening members configured to fasten the base member and the accessory shoe member to the imaging apparatus and inserted into the plurality of fastening holes with the accessory shoe member placed on top of the base member, wherein in the accessory shoe member, a joining portion joining the pair of engagement portions is formed, and wherein the accessory shoe member is formed by bending a plate metal material into a loop shape in such a way that a joint is located between the plurality of fastening holes.

According to the disclosure, it is possible to provide an imaging apparatus including an accessory shoe in which, even if a force to tilt the front side of an upper portion of an attached external accessory device backward is applied to the external accessory device, a pair of engagement portions is less likely to be deformed.

Further features of the present invention will become apparent from the following description of exemplary embodiments with reference to the attached drawings.

DESCRIPTION OF THE EMBODIMENTS

Exemplary embodiments of the present invention will be described in detail below with reference to the attached drawings.

Figure 1A:
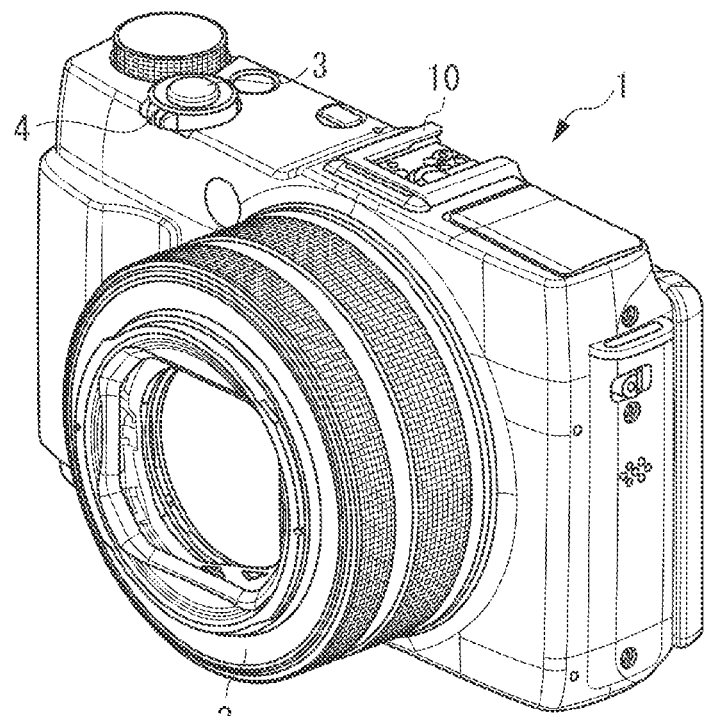
FIGS. 1A and 1B are external perspective views of a digital camera.
Figure 1B:
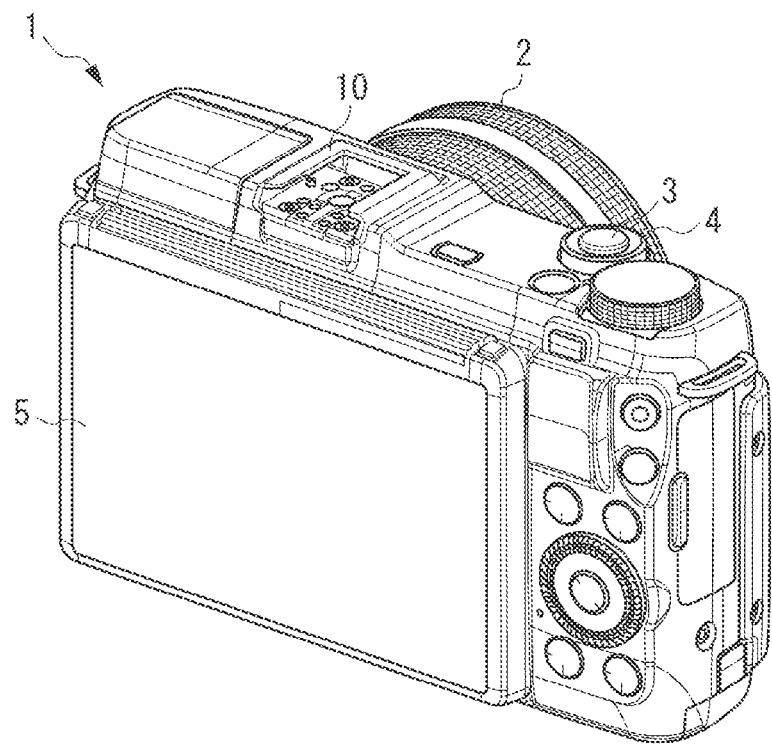

FIGS. 1A and 1B are external perspective views of a digital camera 1, which is an example of an imaging apparatus as disclosed herein. FIG. 1A is a front perspective view of the digital camera 1. FIG. 1B is a rear perspective view of the digital camera 1.

In FIGS. 1A and 1B, the digital camera 1 includes a photographing lens barrel 2, a shutter release button 3, a zoom lever 4, a display monitor 5, and an accessory shoe 10. Two types of external accessory devices can be attached to the accessory shoe 10. One is an external electronic view finder (EVF) 200 illustrated in FIG. 6. The other is an external flash unit 300 illustrated in FIG. 7. These two external accessory devices are different from each other in the fixing direction to the accessory shoe 10.

Figure 2A:
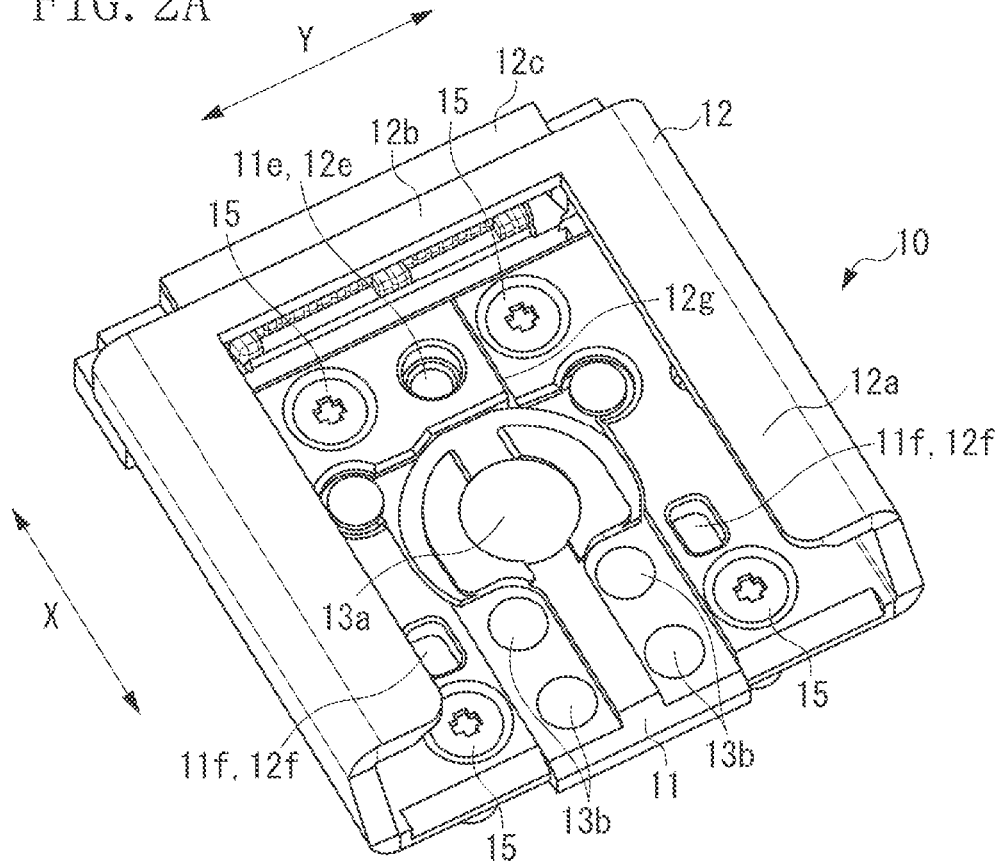
FIGS. 2A and 2B are external perspective views of an accessory shoe.
Figure 2B:
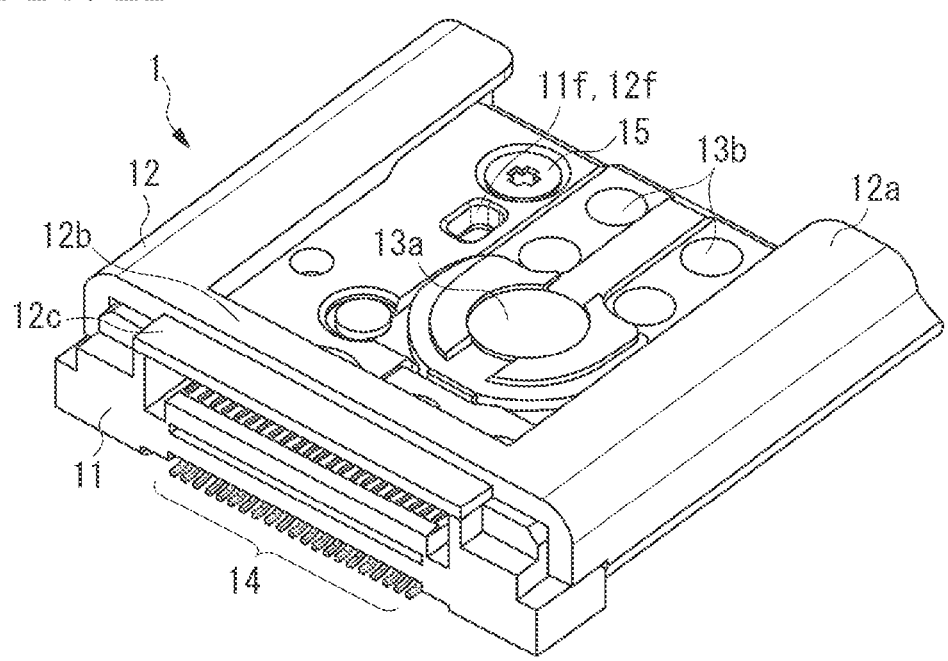

FIGS. 2A and 2B are external perspective views of the accessory shoe 10. FIG. 2A is a top rear perspective view of the accessory shoe 10. FIG. 2B is a top front perspective view of the accessory shoe 10. In FIG. 2A, the direction of an arrow X indicates the attaching direction of an external accessory device to the accessory shoe 10. The direction of an arrow Y indicates the direction perpendicular to the attachment direction of the external accessory device.

Figure 3:
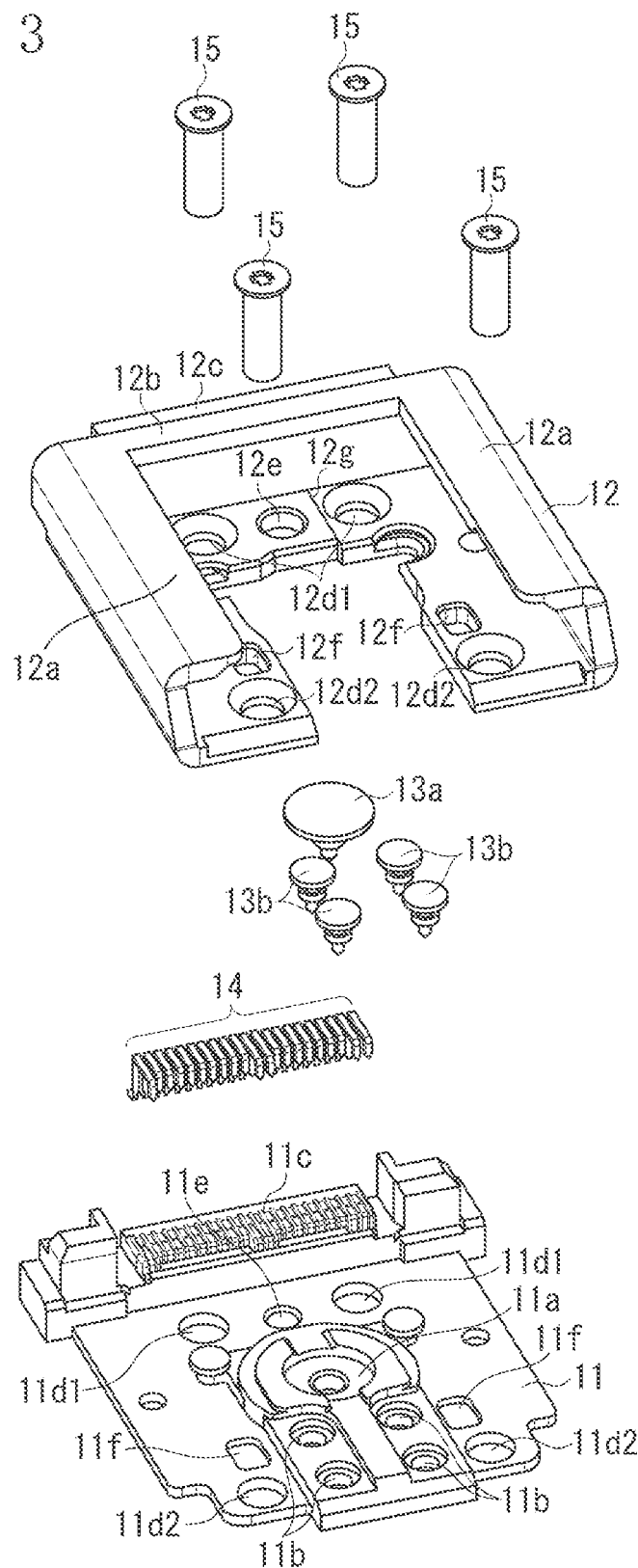
FIG. 3 is an exploded perspective view of the accessory shoe.
Figure 4A:
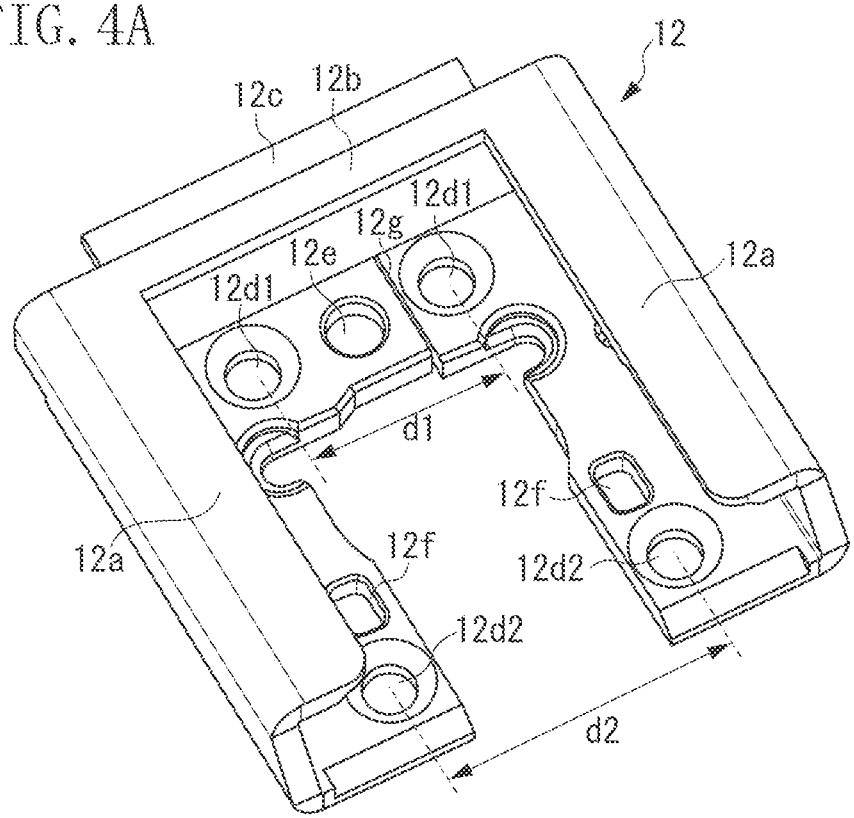
FIGS. 4A and 4B are external perspective views of an accessory shoe member.
Figure 4B:
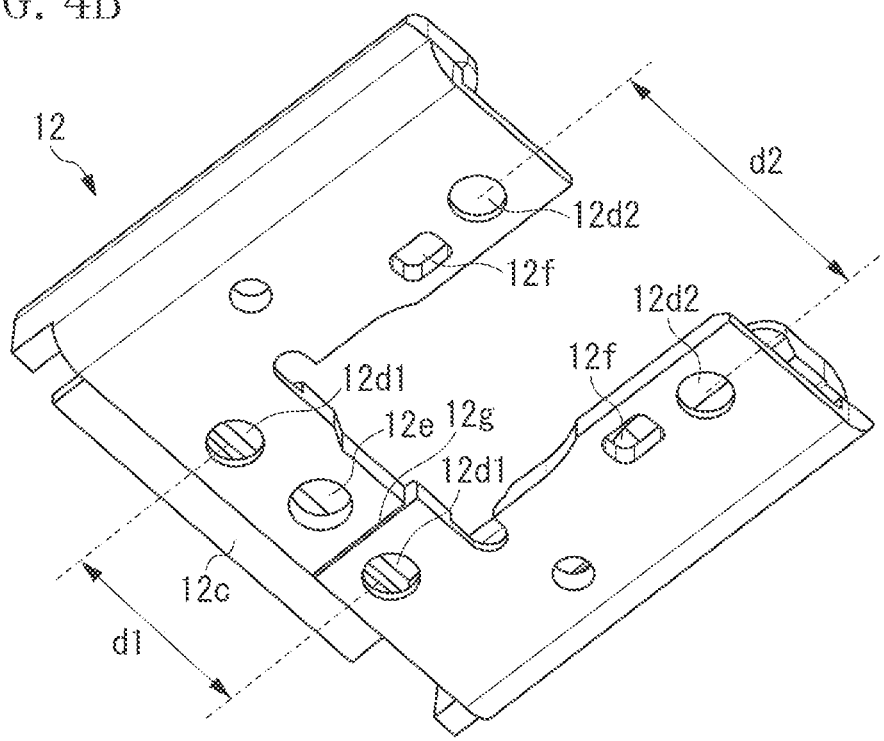

FIG. 3 is an exploded perspective view of the accessory shoe 10. FIGS. 4A and 4B are external perspective views of an accessory shoe member 12. FIG. 4A is a top perspective view of the accessory shoe member 12. FIG. 4B is a bottom perspective view of the accessory shoe member 12.

As illustrated in FIG. 3, in a base member 11, which is made of a synthetic resin material, terminal holding portions 11a and 11b, a contact pin holding portion 11c, screw holes 11d1, screw holes 11d2, a first fitting hole 11e, and a pair of second fitting holes 11f are formed. The terminal holding portion 11a holds a larger diameter contact pin 13a. The terminal holding portions 11b hold smaller diameter contact pins 13b. The contact pin holding portion 11c holds a plurality of contact pins 14. The contact pins 14 function as contact members.

The accessory shoe member 12 is formed by bending a plate metal material into a loop shape. More specifically, the plate metal material is bent so that the end surfaces on both sides of the plate metal material oppose each other. The end surfaces on both sides facing each other at this time form a joint 12g.

As illustrated in FIGS. 4A and 4B, in the accessory shoe member 12, a pair of engagement portions 12a, a joining portion 12b, a thin portion 12c, a pair of screw holes 12d1, a pair of screw holes 12d2, a first fitting hole 12e, a pair of second fitting holes 12f, and the joint 12g are formed.

The pair of engagement portions 12a is formed in the direction perpendicular to the attachment direction of the external accessory device (in the direction Y in FIG. 2A). The pair of screw holes 12d1 is formed to be arranged in the direction perpendicular to the attachment direction of the external accessory device (in the direction Y in FIG. 2A). More specifically, on the front side in the attachment direction of the external accessory device, the pair of screw holes 12d1 functions as a first pair of fastening holes, which is arranged in the direction perpendicular to the attachment direction of the external accessory device.

The first fitting hole 12e is a hole capable of fitting a lock pin thereinto included in the external accessory device and is formed between the pair of screw holes 12d1.

The pair of screw holes 12d2 is formed side by side in the direction perpendicular to the attachment direction of the external accessory device (in the direction Y in FIG. 2A). More specifically, on the rear side in the attachment direction of the external accessory device, the pair of screw holes 12d2 functions as a second pair of fastening holes, which is arranged in the direction perpendicular to the attachment direction of the external accessory device.

The pair of second fitting holes 12f are holes capable of fitting a pair of fitting protrusions thereinto included in the external accessory device. The pair of second fitting holes 12f is formed so that the pair of second fitting holes 12f and the pair of screw holes 12d2 are arranged side by side in the attachment direction of the external accessory device (in the direction X in FIG. 2A).

As illustrated in FIGS. 4A and 4B, a distance d1 between the pair of screw holes 12d1 in the direction perpendicular to the attachment direction of the external accessory device (in the direction Y in FIG. 2A) is shorter than a distance d2 between the pair of screw holes 12d2 in the direction perpendicular to the attachment direction of the external accessory device (in the direction Y in FIG. 2A).

The accessory shoe member 12 is formed so that the joining portion 12b joins the pair of engagement portions 12a. Further, the accessory shoe member 12 is formed by bending a plate metal material into a loop shape so that the joint 12g is located between the first fitting hole 12e and one of the pair of screw holes 12d1.

As illustrated in FIGS. 4A and 4B, the joint 12g of the accessory shoe member 12 is located between the pair of screw holes 12d1 on the front side in the attachment direction of the external accessory device. In the present exemplary embodiment, the distance d1 between the pair of screw holes 12d1 is shorter than the distance d2 between the pair of screw holes 12d2. This shortens the distances between the joint 12g and the pair of screw holes 12d1, thereby preventing deterioration of strength at portions around the joint 12g. Further, in the present exemplary embodiment, the joint 12g does not cross the first fitting hole 12e, and therefore, does not affect the accuracy of the first fitting hole 12e.

The accessory shoe member 12 is attached on top of the base member 11 holding the larger diameter contact pin 13a, the smaller diameter contact pins 13b, and the contact pins 14. At this time, the pair of screw holes 11d1, which is formed in the base member 11, overlaps with the pair of screw holes 12d1, which is formed in the accessory shoe member 12. The pair of screw holes 11d2, which is formed in the base member 11, overlaps with the pair of screw holes 12d2, which is formed in the accessory shoe member 12. The first fitting hole 11e, which is formed in the base member 11, overlaps with the first fitting hole 12e, which is formed in the accessory shoe member 12. The second fitting holes 11f, which are formed in the base member 11, overlap with the second fitting holes 12f, which are formed in the accessory shoe member 12. The accessory shoe member 12 is placed on top of the base member 11 so that each hole overlaps with its corresponding hole. Then, four screws 15 are inserted into the pairs of screw holes 11d1 and 12d1 and the pairs of screw holes 11d2 and 12d2. As illustrated in FIGS. 2A and 2B, the base member 11 and the accessory shoe member 12 are fastened to the digital camera 1 with the four screws 15. The four screws 15 function as a plurality of fastening members.

With the accessory shoe member 12 placed on top of the base member 11, the joining portion 12b of the accessory shoe member 12 covers the plurality of contact pins 14 held by the contact pin holding portion 11c of the base member 11. Thus, when the external accessory device is not attached to the accessory shoe 10, the plurality of contact pins 14 held by the contact pin holding portion 11c is protected by the joining portion 12b.

Figure 5A:
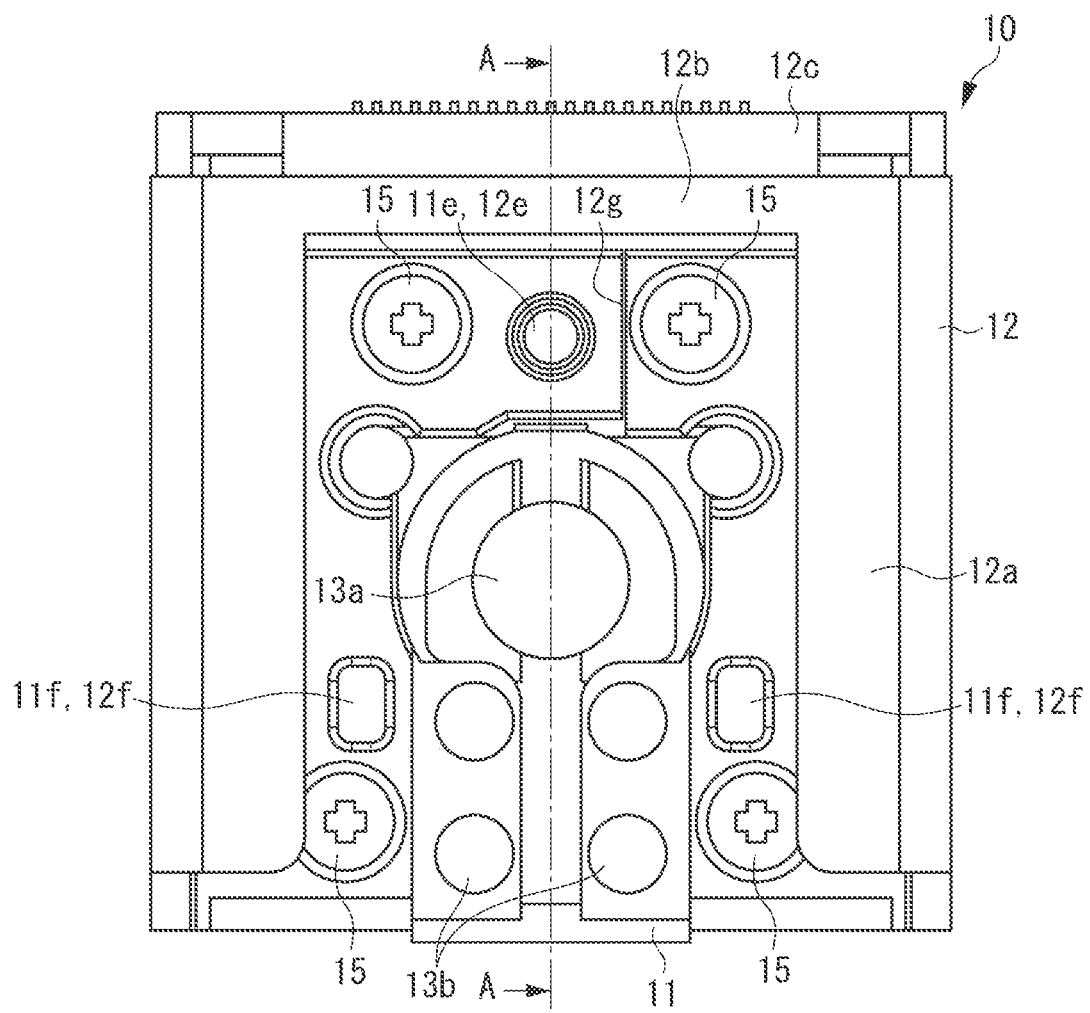
FIGS. 5A and 5B are diagrams illustrating a thickness of a thin portion.
Figure 5B:
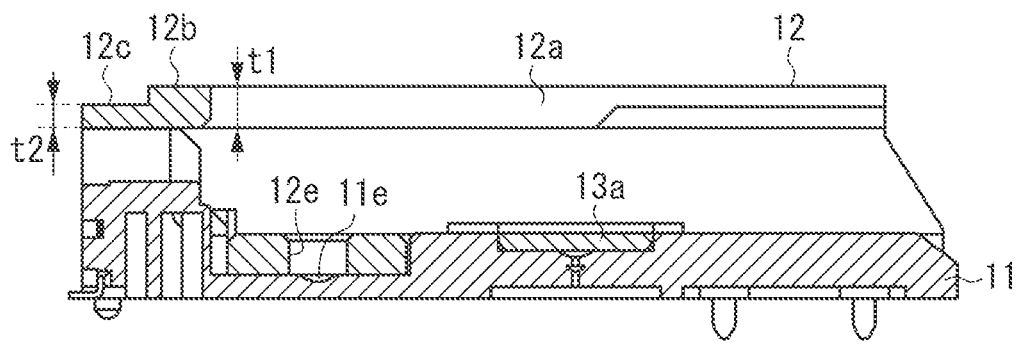

FIGS. 5A and 5B are diagrams illustrating the thickness of the thin portion 12c. FIG. 5A is a top view of the accessory shoe 10. FIG. 5B is a cross-sectional view of FIG. 5A along a line A-A. As illustrated in FIG. 5B, the thin portion 12c is formed so that a thickness t2 of the thin portion 12c is smaller than a thickness t1 of the engagement portions 12a and the joining portion 12b.

Figure 6:
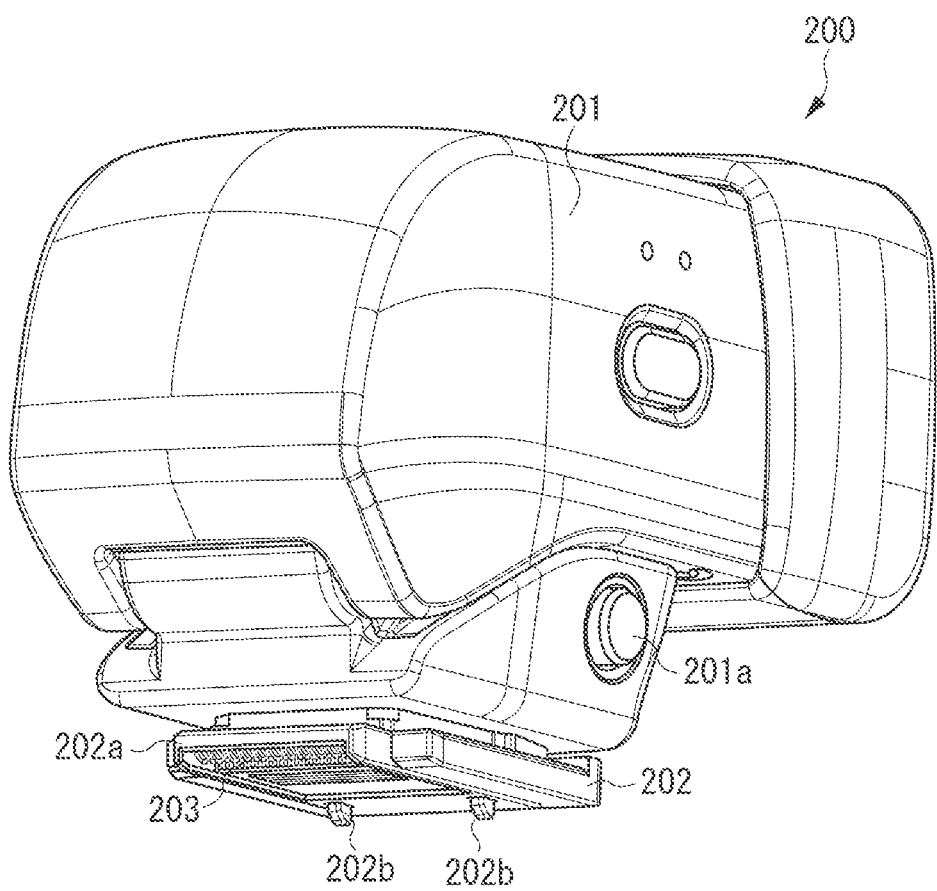
FIG. 6 is an external perspective view of an external electronic view finder (EVF).

FIG. 6 is an external perspective view of the external EVF 200, which can be attached to the accessory shoe 10. The external EVF 200 includes an EVF main body 201 and a connection portion 202. By inserting the connection portion 202 into the accessory shoe 10, the external EVF 200 is attached to the accessory shoe 10.

As illustrated in FIG. 6, a release button 201a is arranged on the EVF main body 201. In the connection portion 202, contact pins 203 and fitting protrusions 202b are arranged. On the front side of the bottom surface of the connection portion 202, a contact holding portion 202a is formed. The contact holding portion 202a holds the contact pins 203. On the rear side of the bottom surface of the connection portion 202, the pair of fitting protrusions 202b is arranged. In the present exemplary embodiment, the front side in the direction of inserting the connection portion 202 into the accessory shoe 10 is defined as the front side of the connection portion 202.

When the external EVF 200 is attached to the accessory shoe 10, the contact holding portion 202a of the connection portion 202 is inserted into the space between the contact pins 14 and the joining portion 12b of the accessory shoe 10, and the contact pins 203 are electrically connected to the contact pins 14. Then, the pair of fitting protrusions 202b fits into the pairs of second fitting holes 11f and 12f of the accessory shoe 10.

Consequently, the external EVF 200 is fixed in an attached state without falling off from the accessory shoe 10. When the release button 201a is pushed in with the external EVF 200 attached to the accessory shoe 10, the fitting protrusions 202b retract from the bottom surface of the connection portion 202, and the fitting between the pair of fitting protrusions 202b and the pairs of second fitting holes 11f and 12f is released. Thus, by pushing in the release button 201a to move the external EVF 200 toward the rear surface direction of the digital camera 1, the external EVF 200 can be detached from the accessory shoe 10.

Figure 7:
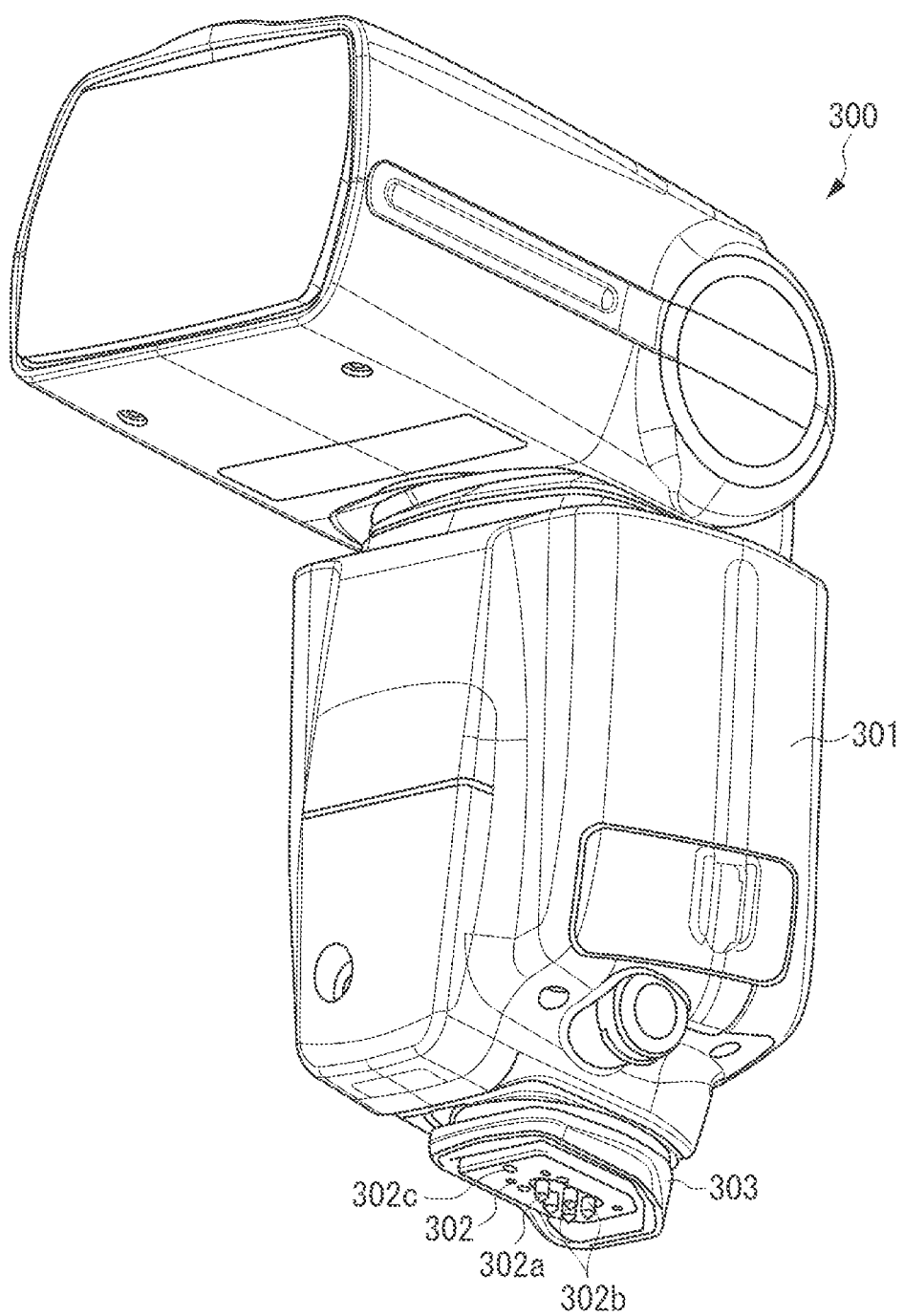
FIG. 7 is an external perspective view of an external flash unit.

FIG. 7 is an external perspective view of the external flash unit 300, which can be attached to the accessory shoe 10. The external flash unit 300 includes a flash main body 301, a connection portion 302, and a drip-proof member 303. By inserting the connection portion 302 into the accessory shoe 10, the external flash unit 300 is attached to the accessory shoe 10.

As illustrated in FIG. 7, contact terminals 302a and 302b and a lock pin 302c are arranged in the connection portion 302. The lock pin 302c is positioned on the front side of the bottom surface of the connection portion 302. The contact terminals 302a and 302b are positioned on the rear side of the bottom surface of the connection portion 302. In the present exemplary embodiment, the front side in the direction of inserting the connection portion 302 into the accessory shoe 10 is defined as the front side of the connection portion 302.

When the external flash unit 300 is attached to the accessory shoe 10, the contact terminal 302a is electrically connected to the larger diameter contact pin 13a, and the contact terminals 302b are electrically connected to the smaller diameter contact pins 13b. The external flash unit 300 includes a lock lever (not illustrated). When the lock lever is operated, the connection portion 302 is pressed against the engagement portions 12a of the accessory shoe member 12, and simultaneously, the lock pin 302c protrudes from the connection portion 302 and fits into the first fitting holes 11e and 12e of the accessory shoe 10. Consequently, the external flash unit 300 is fixed in an attached state without falling off from the accessory shoe 10.

Further, when the lock lever is operated, the drip-proof member 303 comes into close contact with the accessory shoe 10 into which the connection portion 302 has been inserted. More specifically, the drip-proof member 303 is pressed against the accessory shoe member 12, and then the drip-proof member 303 is elastically deformed. This can prevent a water drop or a foreign matter from entering the accessory shoe 10 into which the connection portion 302 has been inserted.

As described above with reference to FIGS. 5A and 5B, the thickness t2 of the thin portion 12c is smaller than the thickness t1 of the joining portion 12b. If the thin portion 12c is formed with the same thickness as the thickness t1 of the joining portion 12b, the amount of deformation of the drip-proof member 303 is too large on the front side of the accessory shoe member 12. In this case, the risk of damaging the drip-proof member 303 increases due to repeated use. If, on the other hand, the accessory shoe member 12 is formed by bending a plate metal material having the thickness of the thin portion 12c into a loop shape, the mechanical strength of the accessory shoe member 12 is insufficient. Thus, in the present exemplary embodiment, the thin portion 12c is formed on the front side of the accessory shoe member 12, thereby ensuring the mechanical strength of the accessory shoe member 12 while preventing the amount of deformation of the drip-proof member 303 from becoming too large.

Figure 8:
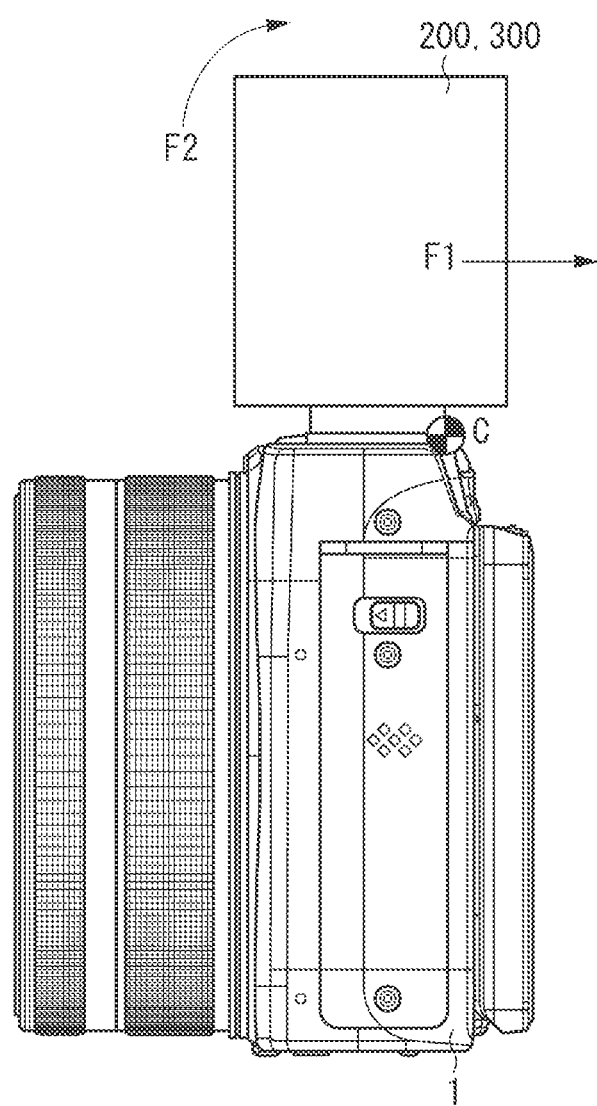
FIG. 8 is a diagram illustrating a state where an external accessory device is attached to the digital camera.

FIG. 8 is a diagram illustrating a state where the external accessory device such as the external EVF 200 or the external flash unit 300 is attached to the accessory shoe 10 of the digital camera 1. Assume that a force F1 illustrated in FIG. 8 is applied to the external accessory device with the external accessory device attached to the accessory shoe 10.

At this time, if the external accessory device attached to the accessory shoe 10 is the external EVF 200 illustrated in FIG. 6, the pair of fitting protrusions 202b abuts the inside of the pairs of second fitting holes 11f and 12f to receive the force F1.

If, on the other hand, the external accessory device attached to the accessory shoe 10 is the external flash unit 300 illustrated in FIG. 7, the lock pin 302c abuts on the inside of the first fitting holes 11e and 12e to receive the force F1.

Further, assume that a force F2 illustrated in FIG. 8 is applied to the external accessory device with the external accessory device attached to the accessory shoe 10. When the force F2 illustrated in FIG. 8 is applied to the external accessory device, the external accessory device is about to rotate around a rotation center C illustrated in FIG. 8.

At this time, if the external accessory device attached to the accessory shoe 10 is the external EVF 200 illustrated in FIG. 6, the contact holding portion 202a of the connection portion 202 abuts the joining portion 12b of the accessory shoe 10 to receive the force F2.

If, on the other hand, the external accessory device attached to the accessory shoe 10 is the external flash unit 300 illustrated in FIG. 7, the front side of the connection portion 302 is pressed against the engagement portions 12a of the accessory shoe member 12 to receive the force F2. On the front side of the bottom surface of the connection portion 302 of the external flash unit 300, a portion corresponding to the contact holding portion 202a illustrated in FIG. 6 is not formed, and thus, a large stress acts intensively on the front side of the engagement portions 12a. In the present exemplary embodiment, however, the front side of the pair of engagement portions 12a is joined by the joining portion 12b. Therefore, even if a large stress acts intensively on the front side of the engagement portions 12a, it is possible to reduce the risk that the front side of the engagement portions 12a is deformed.

As described above with reference to FIGS. 2A and 2B and FIGS. 4A and 4B, the joint 12g of the accessory shoe member 12 is located between the first fitting hole 12e and one of the pair of screw holes 12d1 (the screw hole 12d1 on the right in FIG. 3). When the external flash unit 300 is attached to the accessory shoe 10 and the force F1 illustrated in FIG. 8 is applied to the external flash unit 300, the lock pin 302c presses the inner peripheral surface of the first fitting hole 12e. In the present exemplary embodiment, the joint 12g is formed between the first fitting hole 12e and one of the pair of screw holes 12d1, and thus, the other of the pair of screw holes 12d1 (the screw hole 12d1 on the left in FIG. 3) receives this force. The distance between the first fitting hole 12e and the other of the pair of screw holes 12d1 (the screw hole 12d1 on the left in FIG. 3) is short, and therefore, the accessory shoe member 12 can sufficiently receive the force of the lock pin 302c pressing the inner peripheral surface of the first fitting hole 12e.

At this time, if the joint 12g is located across the first fitting hole 12e, there is an increased risk that the joint 12g is deformed by the force of the lock pin 302c pressing the inner peripheral surface of the first fitting hole 12e. More specifically, the joint 12g is caused to deform in the direction in which the joint 12g is separated on the rear side of the first fitting hole 12e by the force of the lock pin 302c pressing the inner peripheral surface of the first fitting hole 12e.

On the other hand, in the present exemplary embodiment, the joint 12g is located between the first fitting hole 12e and one of the pair of screw holes 12d1, and thus, the force of the lock pin 302c pressing the inner peripheral surface of the first fitting hole 12e does not act directly on the joint 12g. Therefore, in the present exemplary embodiment, even if the lock pin 302c presses the inner peripheral surface of the first fitting hole 12e, it is possible to reduce the risk of deformation of the joint 12g by the resulting force.

As described above, in the present exemplary embodiment, the accessory shoe member 12 is formed by bending a plate metal material into a loop shape so that the joining portion 12b can be formed in the accessory shoe member 12, which increases the strength of the engagement portions 12a. Further, the joint 12g of the accessory shoe member 12 formed by bending a plate metal material into a loop shape is located between the pair of screw holes 12d1 so that it is possible to reduce the risk of a decrease in the strength and the risk of deformation near the joint 12g. The joint 12g does not cross the first fitting hole 12e, and thus, even if the lock pin 302c presses the inner peripheral surface of the first fitting hole 12e, the resulting force does not act directly on the joint 12g. Therefore, the risk of deformation of the joint 12g can be reduced. Further, in the present exemplary embodiment, the accessory shoe member 12 is formed by bending a plate metal material into a loop shape, which prevents an increase in cost for manufacturing the accessory shoe member 12. More specifically, in the present exemplary embodiment, it is possible to manufacture a loop-shaped accessory shoe member at a lower cost than in a case of forming a loop-shaped accessory shoe member by a processing method such as casting, forging, and cutting.

With reference to FIGS. 9A and 9B and FIGS. 11A and 11B, a second exemplary embodiment is described. In the first exemplary embodiment described above, the thin portion 12c is formed in a portion protruding forward from the joining portion 12b. On the other hand, in the second exemplary embodiment, a thin joining portion 22c, which joins a pair of engagement portions 22a, is formed to be thinner than the pair of engagement portions 22a.

Figure 9A:
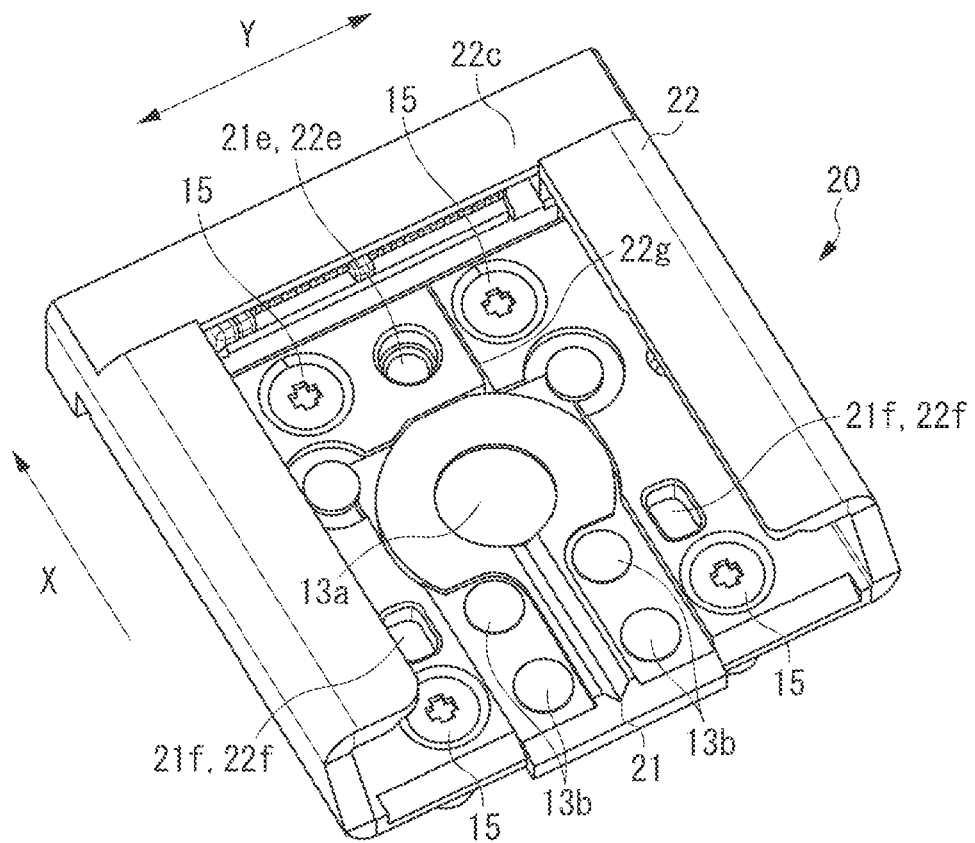
FIGS. 9A and 9B are external perspective views of an accessory shoe.
Figure 9B:
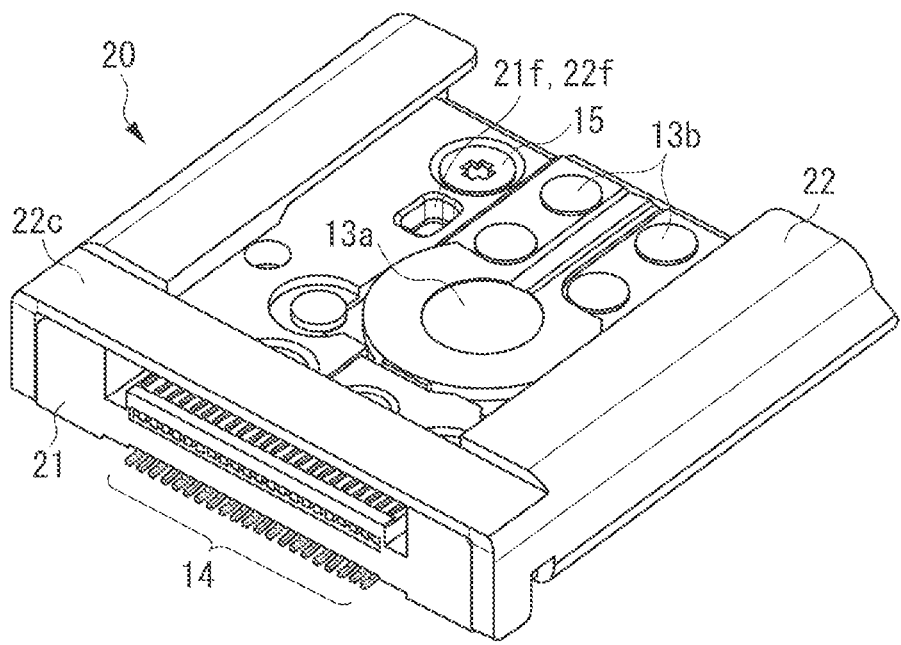
Figure 10:
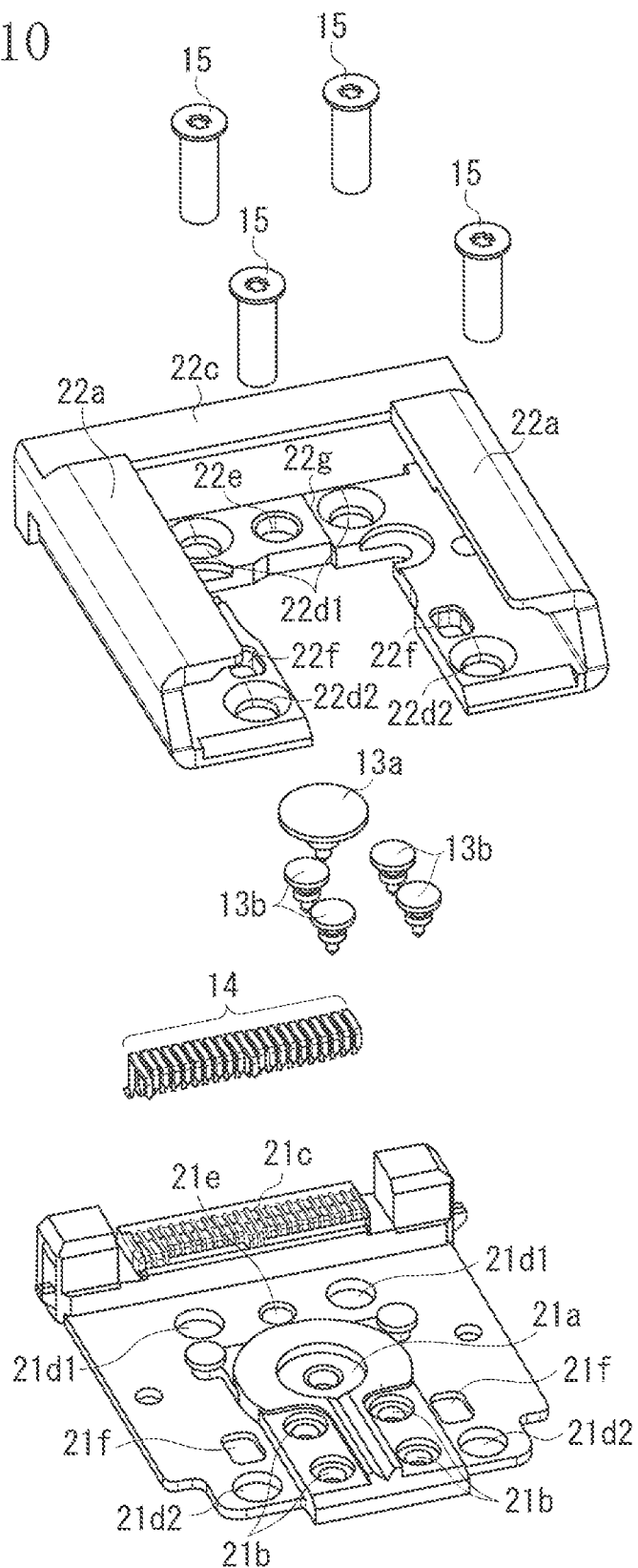
FIG. 10 is an exploded perspective view of the accessory shoe.

FIGS. 9A and 9B are external perspective views of an accessory shoe 20. FIG. 9A is a top rear perspective view of the accessory shoe 20. FIG. 9B is a top front perspective view of the accessory shoe 20. FIG. 10 is an exploded perspective view of the accessory shoe 20.

As illustrated in FIG. 10, in a base member 21, which is made of a synthetic resin material, terminal holding portions 21a and 21b, a contact pin holding portion 21c, a pair of screw holes 21d1, a pair of screw holes 21d2, a first fitting hole 21e, and second fitting holes 21f are formed. The terminal holding portion 21a holds a larger diameter contact pin 13a. The terminal holding portions 21b hold smaller diameter contact pins 13b. The contact pin holding portion 21c holds contact pins 14.

As illustrated in FIG. 10, an accessory shoe member 22 is formed by bending a plate metal material into a loop shape. In the accessory shoe member 22, the pair of engagement portions 22a, the thin joining portion 22c, a pair of screw holes 22d1, a pair of screw holes 22d2, a first fitting hole 22e, second fitting holes 22f, and a joint 22g are formed. The accessory shoe member 22 is formed by bending a plate metal material into a loop shape so that the joint 22g is located between the first fitting hole 22e and one of the screw holes 22d1.

The portions similar to those of the first exemplary embodiment are provided with the same numerals as those of the first exemplary embodiment and are not described here.

Figure 11A:
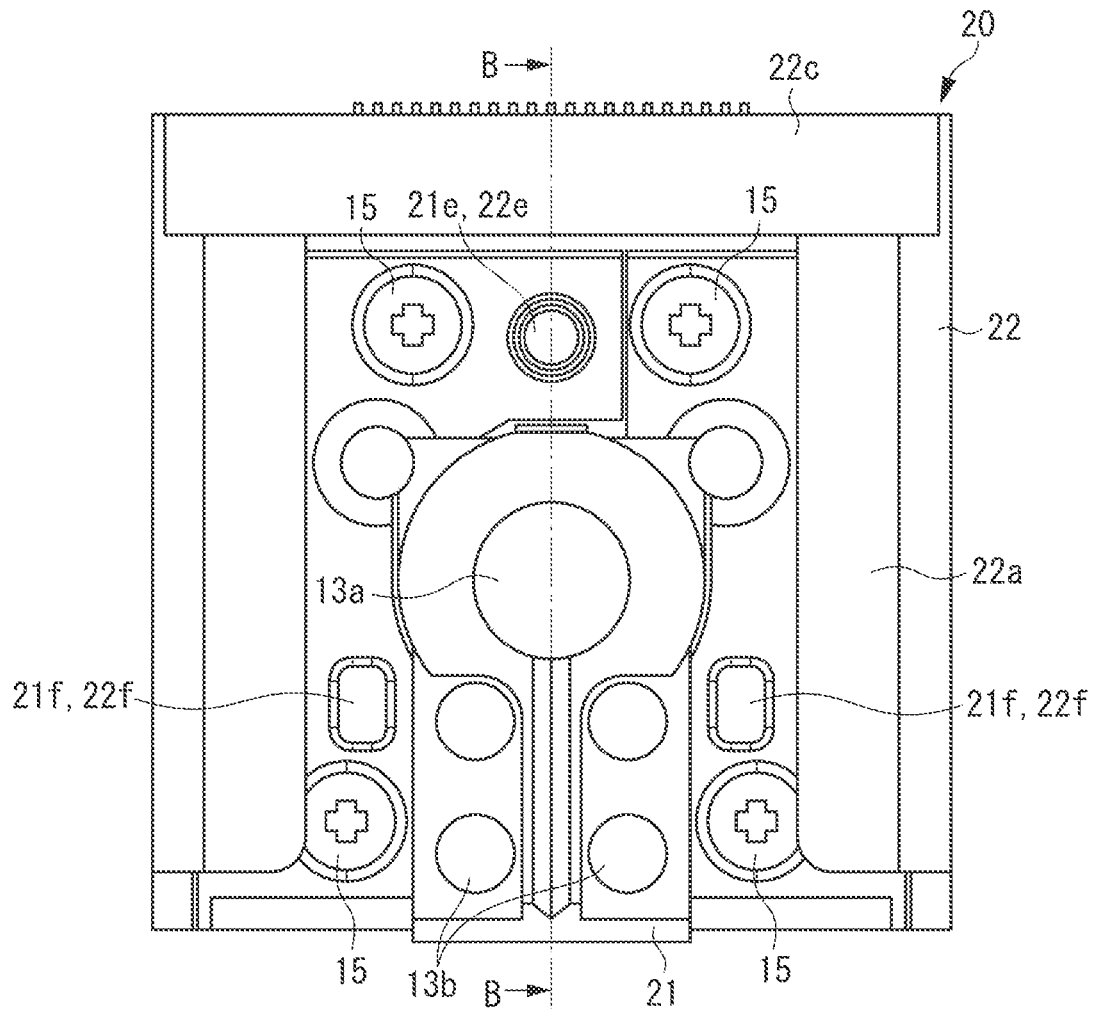
FIGS. 11A and 11B are diagrams illustrating a thickness of a thin joining portion.
Figure 11B:
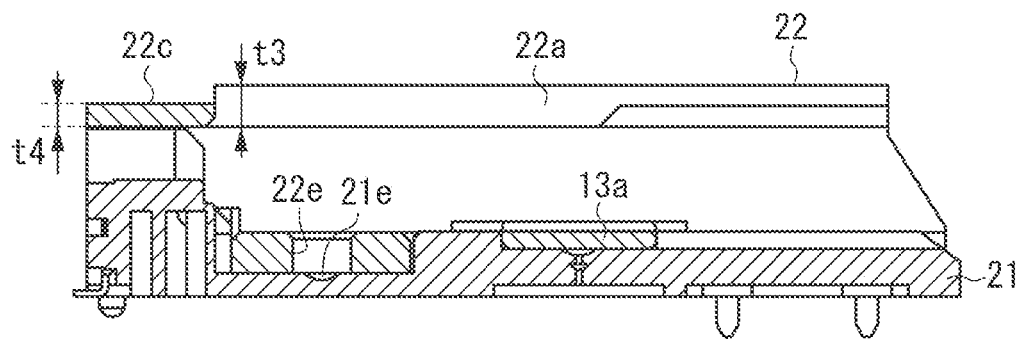

FIGS. 11A and 11B are diagrams illustrating the thickness of the thin joining portion 22c. FIG. 11A is a top view of the accessory shoe 20. FIG. 11B is a cross-sectional view of FIG. 11A along a line B-B. As illustrated in FIG. 11B, the thin joining portion 22c is formed so that a thickness t4 of the thin joining portion 22c is smaller than a thickness t3 of the pair of engagement portions 22a.

As described above, in the present exemplary embodiment, the accessory shoe member 22 is formed by bending a plate metal material into a loop shape so that the thin joining portion 22c can be formed in the accessory shoe member 22, which increases the strength of the engagement portions 22a. Further, the joint 22g of the accessory shoe member 22 formed by bending a plate metal material into a loop shape is located between the pair of screw holes 22d1, so that it is possible to reduce the risk of a decrease in the strength and the risk of deformation near the joint 22g. The joint 22g does not cross the first fitting hole 22e, and thus, even if the lock pin 302c presses the inner peripheral surface of the first fitting hole 22e, the resulting force does not act directly on the joint 22g. Therefore, the risk of deformation of the joint 22g can be reduced. Further, in the present exemplary embodiment, the accessory shoe member 22 is formed by bending a plate metal material into a loop shape, which prevents an increase in cost for manufacturing the accessory shoe member 22.

While the claimed invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-016024 filed Jan. 30, 2014, which is hereby incorporated by reference herein in its entirety.

What is claimed is:

1. An imaging apparatus including an accessory shoe to which an external accessory device can be attached, the imaging apparatus comprising:
   a base member;
   an accessory shoe member placed on top of the base member and configured to have a pair of engagement portions formed in a first direction perpendicular to an attachment direction of the external accessory device and a plurality of fastening holes formed side by side in the first direction; and
   a plurality of fastening members configured to fasten the base member and the accessory shoe member to the imaging apparatus and inserted into the plurality of fastening holes with the accessory shoe member placed on top of the base member,
   wherein in the accessory shoe member, a joining portion joining the pair of engagement portions is formed, and
   wherein the accessory shoe member is formed by bending a plate metal material into a loop shape in such a way that a joint is located between the plurality of fastening holes.

2. The imaging apparatus according to claim 1, wherein the plurality of fastening holes includes a first pair of fastening holes arranged in the first direction on a front side in the attachment direction, and a second pair of fastening holes arranged in the first direction on a rear side in the attachment direction,
   wherein the first pair of fastening holes and the second pair of fastening holes are formed in such a way that a distance between the first pair of fastening holes in the first direction is shorter than a distance between the second pair of fastening holes in the first direction, and
   wherein the joint is located between the first pair of fastening holes.

3. The imaging apparatus according to claim 2, wherein in the accessory shoe member, a first fitting hole capable of fitting a lock pin thereinto included in the external accessory device is formed between the first pair of fastening holes, and wherein the joint is located between the first fitting hole and one of the first pair of fastening holes without crossing the first fitting hole.

4. The imaging apparatus according to claim 2, wherein in the accessory shoe member, a pair of second fitting holes capable of fitting a pair of engagement protrusions thereinto included in the external accessory device is formed, and wherein the pair of second fitting holes is formed in such a way that the pair of second fitting holes and the second pair of fastening holes are arranged side by side in the attachment direction.

5. The imaging apparatus according to claim 1, wherein the base member is made of a synthetic resin material and holds, on a front side in the attachment direction, a plurality of contact members arranged side by side in the first direction, and wherein with the accessory shoe member placed on top of the base member, the joining portion covers the plurality of contact members held by the base member.

6. The imaging apparatus according to claim 5, wherein in the accessory shoe member, a thin portion having a thickness smaller than a thickness of the joining portion is formed further on the front side in the attachment direction than the joining portion.

7. The imaging apparatus according to claim 5, wherein the joining portion is formed with a thickness smaller than a thickness of the pair of engagement portions.

\* \* \* \* \*